(12) United States Patent
Kusumine et al.

(10) Patent No.: US 10,209,868 B2
(45) Date of Patent: Feb. 19, 2019

(54) DISPLAY TERMINAL AND DISPLAY METHOD FOR DISPLAYING APPLICATION IMAGES BASED ON DISPLAY INFORMATION

(71) Applicant: FUJITSU LIMITED, Kawasaki-shi, Kanagawa (JP)

(72) Inventors: Naruhiro Kusumine, Kawasaki (JP); Kota Itakura, Kawasaki (JP); Kazumasa Ushiki, Kawasaki (JP); Akira Fujii, Machida (JP); Tatsuro Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 360 days.

(21) Appl. No.: 14/736,629

(22) Filed: Jun. 11, 2015

(65) Prior Publication Data
US 2015/0370450 A1 Dec. 24, 2015

(30) Foreign Application Priority Data
Jun. 18, 2014 (JP) ................................ 2014-125066

(51) Int. Cl.
G06F 3/0484 (2013.01)
G06F 3/0481 (2013.01)

(52) U.S. Cl.
CPC ...... *G06F 3/04842* (2013.01); *G06F 3/04817* (2013.01)

(58) Field of Classification Search
USPC ....... 715/810, 811, 835, 702, 738, 765, 846, 715/823, 864; 345/619; 707/706
See application file for complete search history.

(56) References Cited

U.S. PATENT DOCUMENTS

| | | | | |
|---|---|---|---|---|
| 9,247,380 B1* | 1/2016 | Vincent | ................... | H04W 4/50 |
| 9,658,738 B1* | 5/2017 | Park | .................... | G06F 3/04817 |
| 2007/0024595 A1* | 2/2007 | Baker | ................. | G06F 3/03547 |
| | | | | 345/173 |
| 2010/0293508 A1* | 11/2010 | Hwang | ............... | G06F 3/04886 |
| | | | | 715/846 |

(Continued)

FOREIGN PATENT DOCUMENTS

| | | |
|---|---|---|
| JP | 2005-309933 | 11/2005 |
| JP | 2008-262251 | 10/2008 |

(Continued)

*Primary Examiner* — Doon Y Chow
*Assistant Examiner* — Wendy Nicholas
(74) *Attorney, Agent, or Firm* — Staas & Halsey LLP

(57) ABSTRACT

A display terminal includes a processor; and a memory which stores a plurality of instructions, executed by the processor, to cause the processor to execute receiving information regarding one or more applications via a network; displaying, on a display screen of the display terminal, displayed images corresponding to each application related to the received information; detecting a predetermined operation for one of the displayed images; storing, for the one of the displayed images for which the predetermined operation was detected, arrangement position information of the image, wherein, in the displaying, the one of the displayed images for which the arrangement position information is stored, is displayed at a fixed position indicated by the arrangement position information independently of the received information.

16 Claims, 25 Drawing Sheets

(56) References Cited

U.S. PATENT DOCUMENTS

| | | | |
|---|---|---|---|
| 2011/0148806 A1* | 6/2011 | Oda | G06F 3/03545 345/174 |
| 2011/0191611 A1 | 8/2011 | boni ang gaw go et al. | |
| 2011/0285665 A1 | 11/2011 | Matsumoto | |
| 2012/0015624 A1* | 1/2012 | Scott | G06F 9/4443 455/405 |
| 2012/0082144 A1* | 4/2012 | Lee | H04W 4/001 370/338 |
| 2012/0105358 A1* | 5/2012 | Momeyer | G06F 3/0414 345/174 |
| 2013/0080890 A1* | 3/2013 | Krishnamurthi | G06F 9/4443 715/702 |
| 2013/0326583 A1* | 12/2013 | Freihold | G06F 3/04815 726/3 |
| 2014/0289642 A1* | 9/2014 | Prasad | G06F 3/048 715/745 |
| 2015/0065170 A1* | 3/2015 | Brisebois | H04W 4/003 455/456.3 |
| 2015/0089359 A1* | 3/2015 | Brisebois | G06F 3/04817 715/702 |
| 2015/0277671 A1* | 10/2015 | Nagata | G06F 3/0482 715/811 |

FOREIGN PATENT DOCUMENTS

| | | |
|---|---|---|
| JP | 2011-159077 | 8/2011 |
| JP | 2012-3742 | 1/2012 |
| JP | 2013-3607 | 1/2013 |

\* cited by examiner

FIG. 8

| SSID | CONTEXT |
|---|---|
| 00-AB-CD-01 | SCHOOL |
| 00-CD-EF-02 | STATION |
| 00-GH-KL-03 | HOSPITAL |
| 00-GH-KL-04 | SCHOOL |
| ⋮ | ⋮ |

| CONTEXT ID | APP ID | ARRANGEMENT POSITION INFORMATION |
|---|---|---|
| SCHOOL | App11 | (0,0) |
|  | App12 | (0,1) |
|  | App13 | (0,2) |
| STATION | App21 | (0,0) |
|  | App11 | (0,1) |
| HOSPITAL | App31 | (0,0) |

| CONTEXT ID | APP ID | ARRANGEMENT POSITION INFORMATION | FIXATION FLAG | USER ID |
|---|---|---|---|---|
| SCHOOL | App11 | (0,0) | OFF | User1 |
| | App12 | (0,1) | OFF | |
| | App13 | (0,2) | OFF | |
| STATION | App21 | (0,0) | OFF | |
| | App11 | (0,1) | OFF | |
| HOSPITAL | App31 | (0,0) | OFF | |
| ... | ... | ... | ... | User2 |
| ... | ... | ... | ... | ... |

| APP ID | APP URL | ICON URL |
|---|---|---|
| App1 | http://xxxxxxx/app/App1.zip | http://xxxxxxx/app/App1.zip/icon.png |
| App11 | http://yyyyyyy/app/App11.zip | http://yyyyyyy/app/App11.zip/icon.png |
| App21 | http://zzzzzzz/app/App21.zip | http://zzzzzzz/app/App21.zip/icon.png |
| | | |

| CONTEXT ID | APP ID | ARRANGEMENT POSITION INFORMATION | FIXATION FLAG | USER ID |
|---|---|---|---|---|
| SCHOOL | App11 | (0,0) | ON | User1 |
| | App12 | (0,1) | OFF | |
| | App13 | (0,2) | OFF | |
| STATION | App21 | (0,1) | OFF | |
| HOSPITAL | App31 | (0,0) | ON | |
| | ... | ... | OFF | |
| ... | ... | ... | ... | User2 |
| ... | ... | ... | ... | ... |

414

FIG. 17
(1) (2)
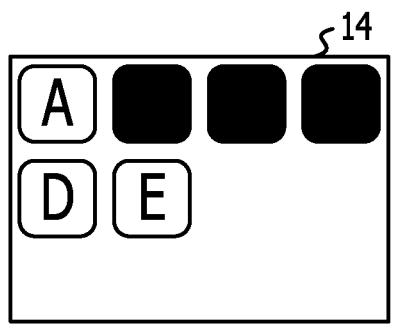 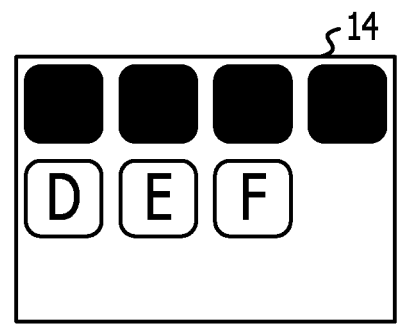
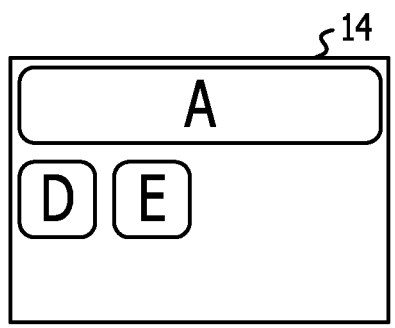 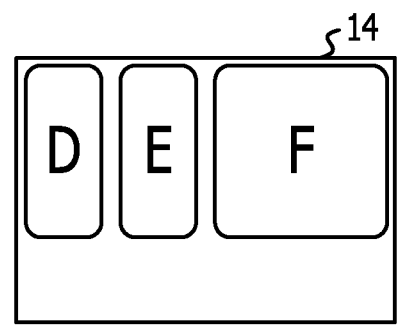

FIG. 21

| PRESSURE × CONTACT AREA | CONTACT TIME | OPERATION TYPE |
|---|---|---|
| 0<x<0.06 | 0<t<0.1 | TAP |
| 0.04≦x≦0.24 | 0.1≦t≦1.5 | LONG TAP |
| 0.15<x | 1.5<t | DEPRESSION |

FIG. 23

| CONTEXT ID | APP ID | ARRANGEMENT POSITION INFORMATION | FIXATION FLAG | USER ID |
|---|---|---|---|---|
| SCHOOL | App11 | (0,0) | ON | User1 |
| | App12 | (0,1) | OFF | |
| | App13 | (0,2) | OFF | |
| STATION | App21 | (0,0) → (0,1) | OFF | |
| | App11 | (0,1) → (0,0) | ON | |
| HOSPITAL | App31 | (0,0) → (0,1) | OFF | |
| | ... | ... | ... | User2 |
| ... | ... | ... | ... | ... |

414

DISPLAY TERMINAL AND DISPLAY METHOD FOR DISPLAYING APPLICATION IMAGES BASED ON DISPLAY INFORMATION

CROSS-REFERENCE TO RELATED APPLICATION

This application is based upon and claims the benefit of priority of the prior Japanese Patent Application No. 2014-125066, filed on Jun. 18, 2014, the entire contents of which are incorporated herein by reference.

FIELD

The embodiments discussed herein are related to, for example, a display terminal, a display method, and a program.

BACKGROUND

Conventionally, there have been techniques for delivering an application group suitable for a situation of a user to a smart terminal, such as a smart phone, a tablet terminal, and the like. A smart terminal causes display of the icons of delivered applications on a desktop screen and starts an application related to a selected icon. Using such techniques, a user may easily use an application suitable for a then situation of the user. For example, Japanese Laid-open Patent Publication No. 2013-3607 and Japanese Laid-open Patent Publication No. 2011-159077 discuss the related art.

SUMMARY

In accordance with an aspect of the embodiments, a display terminal includes a processor; and a memory which stores a plurality of instructions, executed by the processor, to cause the processor to execute receiving information regarding one or more applications via a network; displaying, on a display screen of the display terminal, displayed images corresponding to each application related to the received information; detecting a predetermined operation for one of the displayed images; storing, for the one of the displayed images for which the predetermined operation was detected, arrangement position information of the image, wherein, in the displaying, the one of the displayed images for which the arrangement position information is stored, is displayed at a fixed position indicated by the arrangement position information independently of the received information.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 8 is a table illustrating a configuration example of a context information storage unit;

FIG. 9 is a table illustrating a configuration example of an arrangement information storage unit;

FIG. 11 is a table illustrating a configuration example of a user-individual arrangement information storage unit;

FIG. 12 is a table illustrating a configuration example of an address information storage unit;

FIG. 13 is a table illustrating an example of arrangement information after an arrangement position is fixed for an application;

FIG. 17 is a diagram illustrating an example of icon enlarged display when the limitation of the enlarged size of an icon is relaxed;

FIG. 21 is a table illustrating a configuration example of a determined information storage unit;

FIG. 23 is a table illustrating an example of change of duplicate arrangement position information with fixation arrangement information;

DESCRIPTION OF EMBODIMENTS

Figure 1:
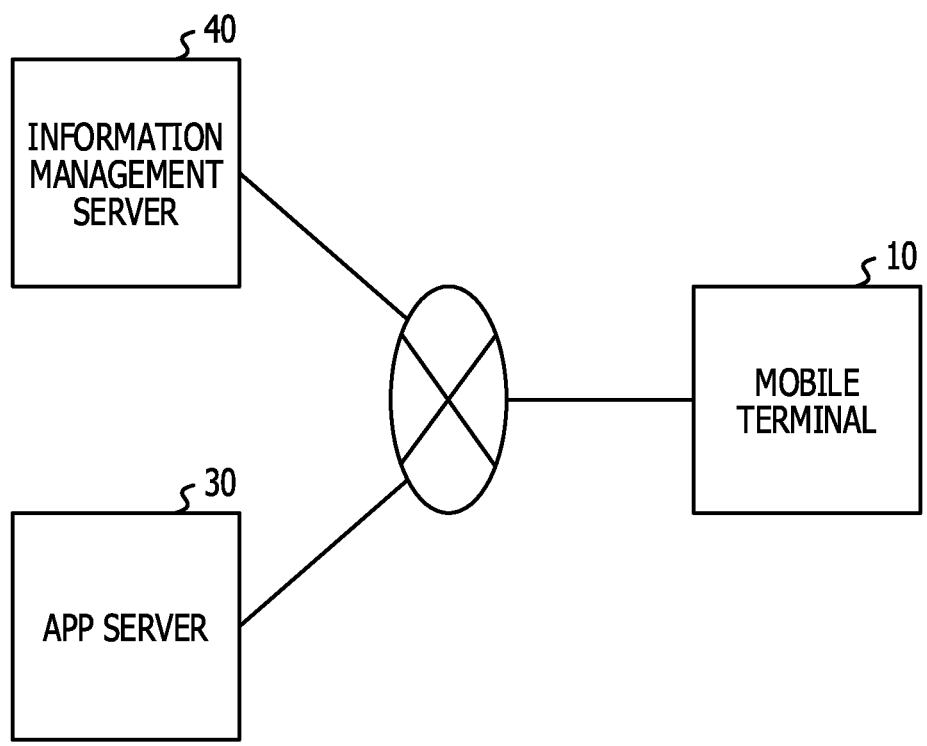
FIG. 1 is a diagram illustrating a configuration example of an information processing system according to a first embodiment.

Embodiments of the present disclosure will be described below with reference to the accompanying drawings. FIG. 1 is a diagram illustrating a configuration example of an information processing system according to a first embodiment. In the information processing system illustrated in FIG. 1, a mobile terminal 10 is connectable to one or more app servers 30, an information management server 40, and the like, via a network, such as the Internet, a local area network (LAN), and the like.

The mobile terminal 10 is a portable terminal, such as a mobile phone, a smart phone, a tablet terminal, and the like. The mobile terminal 10 has a function of downloading (acquiring) an application from the app server 30 and executing the application. An application may be a program described in a programming language and may be Web contents. Web contents are display data that is browsable by a general-purpose Web browser. Web contents include HyperText Markup Language (HTML), Cascading Style Sheets (CSS), a script, and the like. CSS and a script may be defined in different files from an HTML file, and may be included in an HTML file. A script is, for example, JavaScript (registered trademark). The display state of Web contents may be made dynamic by the script, and Web contents may be made to function as an application.

The app server 30 is a computer that sends back, in accordance with an application download request transmitted from the mobile terminal 10, an application corresponding to a uniform resource locator (URL) designated in the request. Note that an application stored in the mobile terminal 10 in advance may be a display target.

The information management server 40 is a computer that supports providing an application corresponding to a context of a user of the mobile terminal 10. A context is a concept indicating a situation of a user, such as, for example, a current location, current date and time, current weather, current temperature, current humidity, user's current psychological state, and the like.

Figure 2:
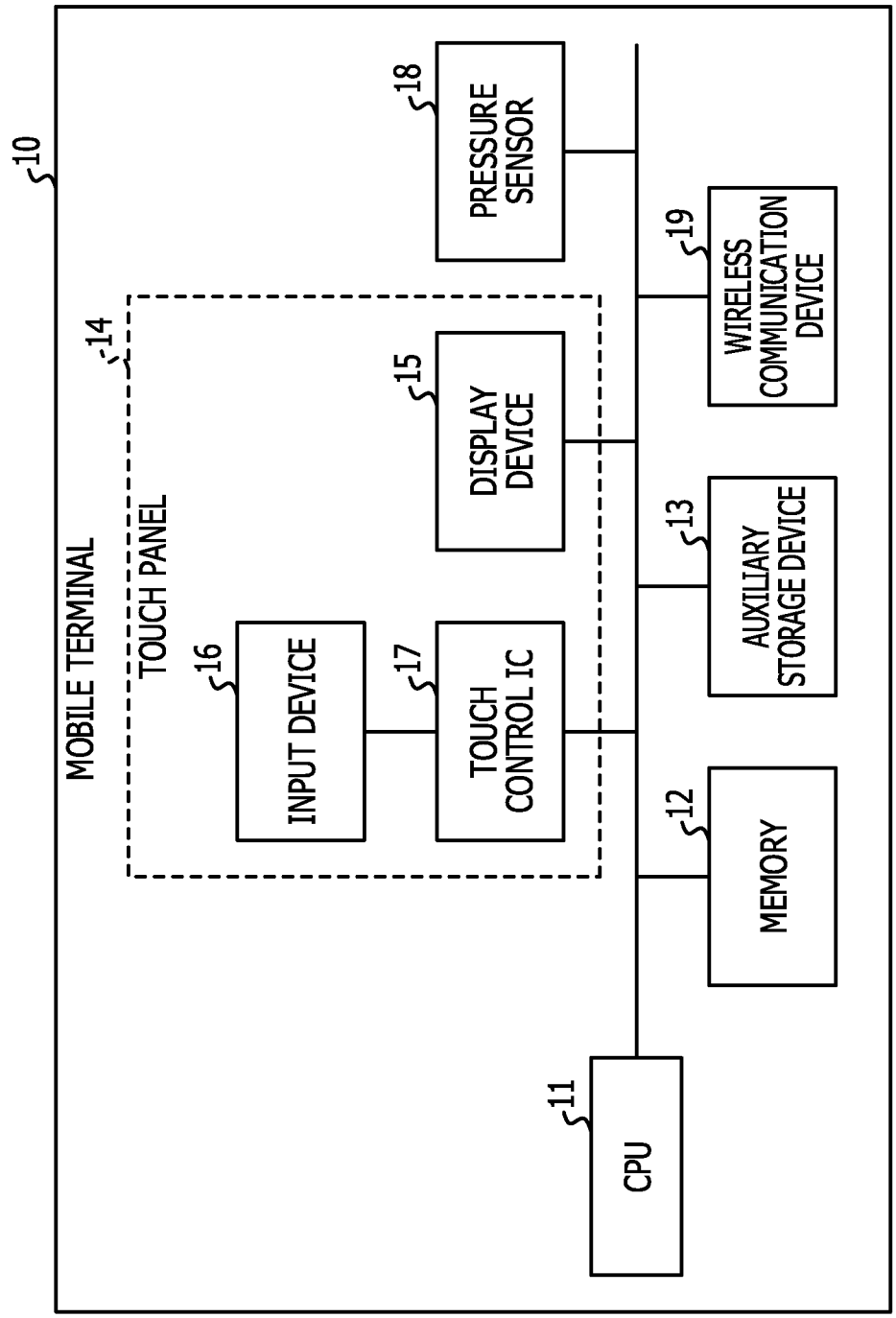
FIG. 2 is a diagram illustrating a hardware configuration example of a mobile terminal according to the first embodiment.

FIG. 2 is a diagram illustrating a hardware configuration example of a mobile terminal according to the first embodiment. In FIG. 2, the mobile terminal 10 includes CPU 11, a memory 12, an auxiliary storage device 13, a touch panel 14, a pressure sensor 18, a wireless communication device 19, and the like.

The auxiliary storage device 13 stores a program, or the like, installed in the mobile terminal 10. When an instruction for starting a program is made, the memory 12 reads out the program from the auxiliary storage device 13 and stores the program. CPU 11 realizes a function related to the mobile terminal 10 in accordance with a program stored in the memory 12.

The touch panel 14 is an electronic component including both of an input function and a display function, and performs display of information, reception of an input from a user, and the like. The touch panel 14 includes a display device 15, an input device 16, a touch control IC 17, and the like.

The display device 15 is a liquid crystal panel, or the like, and has a display function of the touch panel 14. The input device 16 is an electronic component including a sensor that detects a contact of a contact object to a surface (a contact surface) of the touch panel 14. A method for detecting a contact of a contact object may be any of known methods, such as an electrostatic capacitance method, a resistance film method, an optical method, and the like. The input device 16 inputs an assembly (which will be hereinafter referred to as a "sensor coordinate group") of coordinates of the sensor that reacted to a contact object (that is, that detected a contact) to the touch control IC 17. Note that the contact object is an object that contacts the touch panel 14. Examples of the object include a finger of a user, a special or general pen, and the like.

The touch control IC 17 is an integrated circuit (IC) that executes identification of the shape of a contact part of a contact object, based on the sensor coordinate group input by the input device 16. The pressure sensor 18 is an electronic component that detects the magnitude of a pressure that is applied due to a contact of a contact object to a contact surface of the touch panel 14 and thus acts on the contact surface. The wireless communication device 19 is an electronic component, such as an antenna, and the like, which is used for performing communication via a wireless local area network (LAN), a mobile communication network, or the like.

Figure 3:
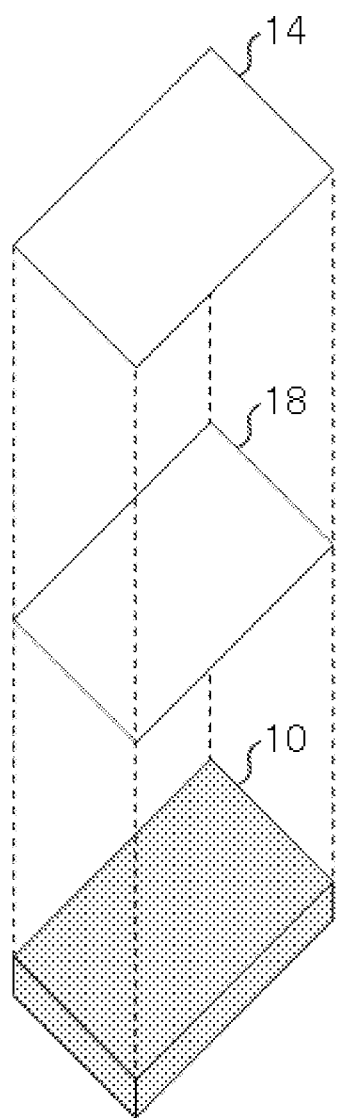
FIG. 3 is a diagram illustrating an arrangement example of a pressure sensor.

FIG. 3 is a diagram illustrating an arrangement example of a pressure sensor. As illustrated in FIG. 3, the pressure sensor 18 has a sheet-like planar shape and is disposed under the touch panel 14. For example, the pressure sensor 18 may detect a pressure on an entire or substantially entire contact surface of the touch panel 14.

Figure 4:
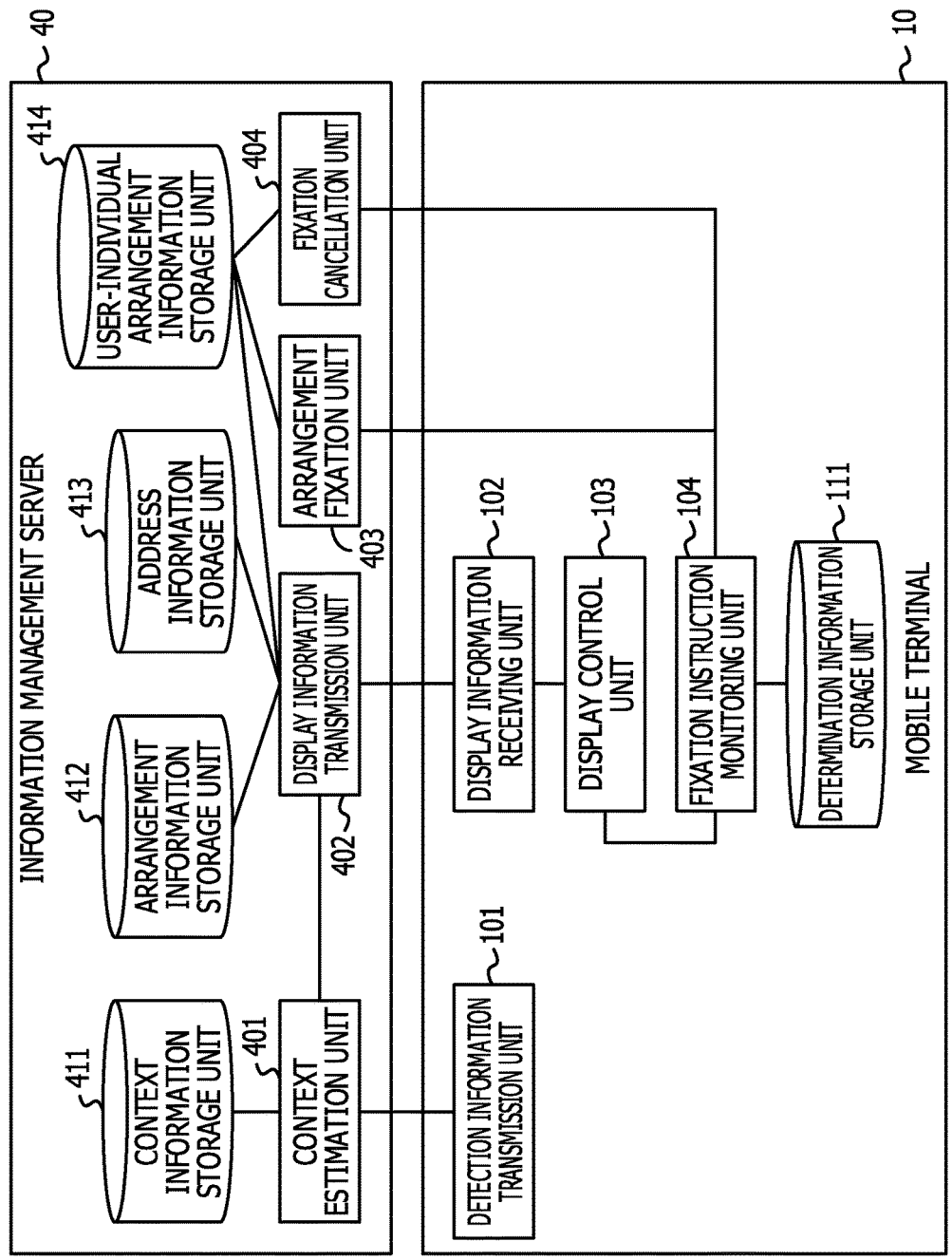
FIG. 4 is a diagram illustrating a function configuration example of a mobile terminal and an information management server according to the first embodiment.

FIG. 4 is a diagram illustrating a function configuration example of a mobile terminal and an information management server according to the first embodiment.

In FIG. 4, the mobile terminal 10 includes a detection information transmission unit 101, a display information receiving unit 102, a display control unit 103, a fixation instruction monitoring unit 104, and the like. Each of the above-described units is realized by processing which one or more programs installed in the mobile terminal 10 cause CPU 11 to execute. The mobile terminal 10 includes a determination information storage unit 111. The determination information storage unit 111 may be realized, for example, using the auxiliary storage device 13.

The detection information transmission unit 101 transmits information (which will be hereinafter referred to as "context estimation information") used for estimating a context, which is detected by the mobile terminal 10, to the information management server 40. In this embodiment, a service set identifier (SSID) of an access point of a wireless LAN is used as the context estimation information.

The display information receiving unit 102 receives information regarding one or more applications corresponding to a context estimated based on SSID transmitted by the detection information transmission unit 101 and information regarding the arrangement position (display position) of the icon of each application from the information management server 40. An application corresponding to a context is an application that is a display target in the context.

The display control unit 103 performs display control of a screen on which a list of icons of applications corresponding to a context, and the like, based on information received by the display information receiving unit 102. Each icon is arranged, based on arrangement position information set for each application. Note that the arrangement position information of each application is set for each context, for example, in descending order of probability of being used in the context. Therefore, when an application corresponds to a plurality of contexts, there is a probability that the arrangement position of the application differs for each context.

The fixation instruction monitoring unit 104 monitors input of a predetermined operation that indicates an arrangement position fixation instruction for one of icons displayed by the display control unit 103. Arrangement position fixation is to fix the arrangement position of the icon of an application to a specific position across contexts. When the fixation instruction monitoring unit 104 detects an operation that indicates an arrangement position fixation instruction, the fixation instruction monitoring unit 104 transmits, to the information management server 40, an arrangement position fixation request for an application related to an icon that is an operation target.

Figure 5:
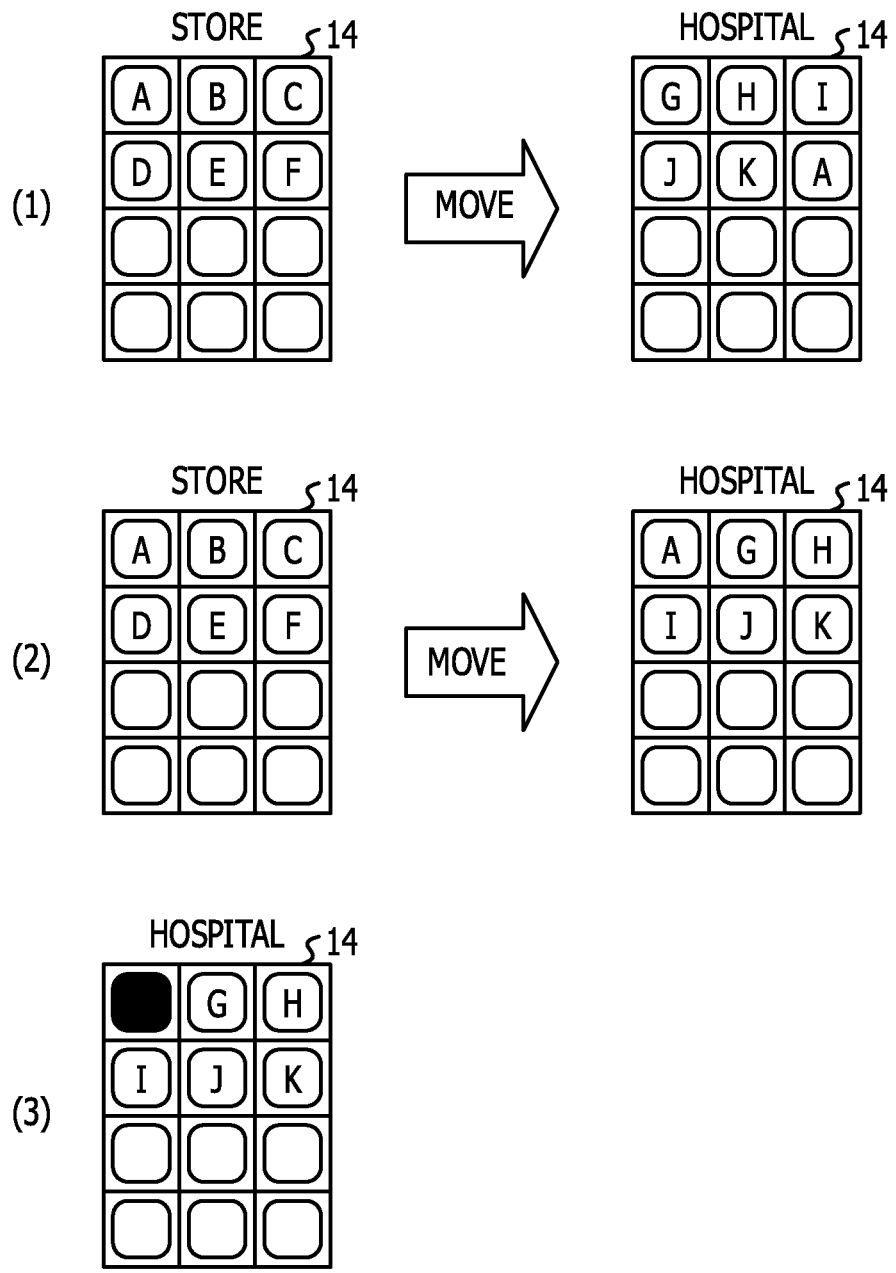
FIG. 5 is a diagram illustrating icon arrangement position fixation.

FIG. 5 is a diagram illustrating icon arrangement position fixation. In FIG. 5, an arrangement example for icons on the touch panel 14 is illustrated. Alphabets "A" to "K" are used to simply indicate icons. In the following, when an application related to each icon is distinguished from one application, the corresponding one of the alphabets illustrated in FIG. 5 is added to the end of a word "application". Note that, in FIG. 5, an example where, in a case where a user is in a store, the applications A to F are display targets and, in a case where a user is in a hospital, the applications A and G to K are display targets is illustrated. That is, the application A is a display target in each of a context where the user is in a store and a context where the user is in a hospital.

In FIG. 5, (1) illustrates, for the application A, a state where the arrangement positions of the icons are not fixed. As clearly illustrated in FIG. 5, the arrangement position of the icon of the application A differs between in the case where the user is in a store and in the case where the user is in a hospital.

On the other hand, (2) illustrates, for the application A, a state after an arrangement position fixation instruction is performed. In this case, the arrangement position of the icon of the application A does not differ even when a context differs. As a result, a probability that a user who remembers the arrangement position of the application performs an error operation may be reduced. Also, search for the icon of the application may be simplified.

Note that, in this embodiment, in an arrangement position fixed for an application, in a context to which the application does not correspond, the icon of another application is not arranged. For example, when applications corresponding to "hospital" are the applications G to K and the arrangement position of the application A is fixed as illustrated in (2), the arrangement position of the icon of each application in "hospital" is, for example, as illustrated in (3). In (3), no application is arranged in the arrangement position of the application A. In this case, an icon (which will be hereinafter referred to as a "gray icon") filled with gray is arranged in the arrangement position of the application A. Thus, in a "hospital", when a user who remembers the arrangement position of the application A tries to operate the application A, another application is not executed by mistake.

The fixation instruction monitoring unit 104 monitors an operation that indicates an arrangement position fixation cancellation instruction for an application, the arrangement position of an icon of which is fixed. Specifically, when the same operation as that of a fixation instruction is performed on the icon of an application, the arrangement position of which is fixed, the fixation instruction monitoring unit 104 interprets the operation as an arrangement position fixation cancellation instruction. When the fixation instruction monitoring unit 104 detects an operation that indicates an arrangement position fixation cancellation instruction, the fixation instruction monitoring unit 104 transmits an arrangement position fixation cancellation request for an allocation related to the icon that is an operation target to the information management server 40.

The determination information storage unit 111 stores information used for determining whether or not an operation performed by a user is an operation that indicates a fixation instruction.

The information management server 40 includes a context estimation unit 401, a display information transmission unit 402, an arrangement fixation unit 403, a fixation cancellation unit 404, and the like. Each of the above-described units is realized by processing which one or more programs installed in the information management server 40 cause a CPU of the information management server 40 to execute. The information management server 40 uses a context information storage unit 411, an arrangement information storage unit 412, an address information storage unit 413, a user-individual arrangement information storage unit 414, or the like. Each of the above-described storage units may be realized using an auxiliary storage device of the information management server 40 or a storage device connected to the information management server 40 via a network, or the like.

The context estimation unit 401 estimates or determines a context of a user with reference to the context information storage unit 411. The context information storage unit 411 stores a context ID in association with SSID. Therefore, the context ID of a context of a user is identified by the context estimation unit 401. A context ID is an identification information for each context.

The display information transmission unit 402 identifies one or more applications corresponding to a context estimated by the context estimation unit 401 and transmits arrangement position information of each corresponding application and the uniform resource locators (URLs) of the icon and substance of the corresponding application to the mobile terminal 10. The arrangement information storage unit 412 stores, for each context, the identification information (which will be hereinafter referred to as an "app ID") of each application corresponding to the context and the arrangement position information of each application. The address information storage unit 413 stores the URLs of the icon and substance of each application.

In accordance with an arrangement position fixation request for the icon of an application, which is transmitted from the mobile terminal 10, the arrangement fixation unit 403 stores information indicating that the arrangement position of the application is fixed and also indicating an arrangement position after the fixation, and the like, in the user-individual arrangement information storage unit 414. In accordance with an arrangement position fixation cancellation request for the icon of an application, which is transmitted from the mobile terminal 10, the fixation cancellation unit 404 deletes information indicating that the arrangement position of the application is fixed, which is stored in the user-individual arrangement information storage unit 414.

The user-individual arrangement information storage unit 414 stores, for each user, the arrangement position information of each application for each context, information indicating whether or not the arrangement position of each application is fixed, and the like.

Figure 6:
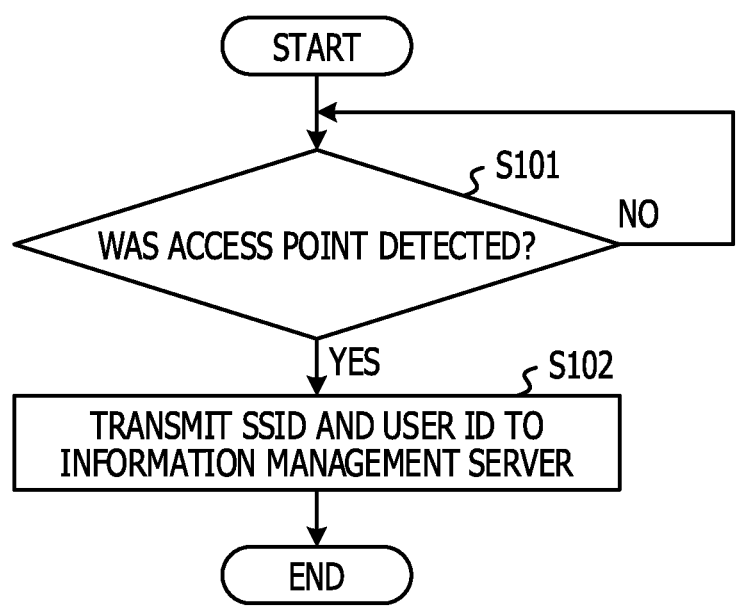
FIG. 6 is a flow chart illustrating an example of context estimation information transmission processing.

Process steps executed by the mobile terminal 10 and the information management server 40 will be described below. FIG. 6 is a flow chart illustrating an example of context estimation information transmission processing. The processing of FIG. 6 may be automatically started, and may be started in accordance with an application display instruction, or the like, input by a user.

If an access point is detected by the wireless communication device 19 (YES in S101), the detection information transmission unit 101 transmits SSID of the access point and a user ID to the information management server 40 (S102). The user ID may be input, for example, by a user when a start instruction for the processing of FIG. 6 is made (S102). As another alternative, the user ID may be stored in the mobile terminal 10. Also, the user ID may be identification information, such as, for example, a telephone number, and the like, for each mobile terminal 10.

Note that another information, such as a current location, current date and time, current weather, current temperature, current humidity, user's current psychological state, and the like, may be used as context estimation information. Also, the context estimation information may be input by a user. For example, for the user's current psychological state, a character string may be input by a user.

Figure 7:
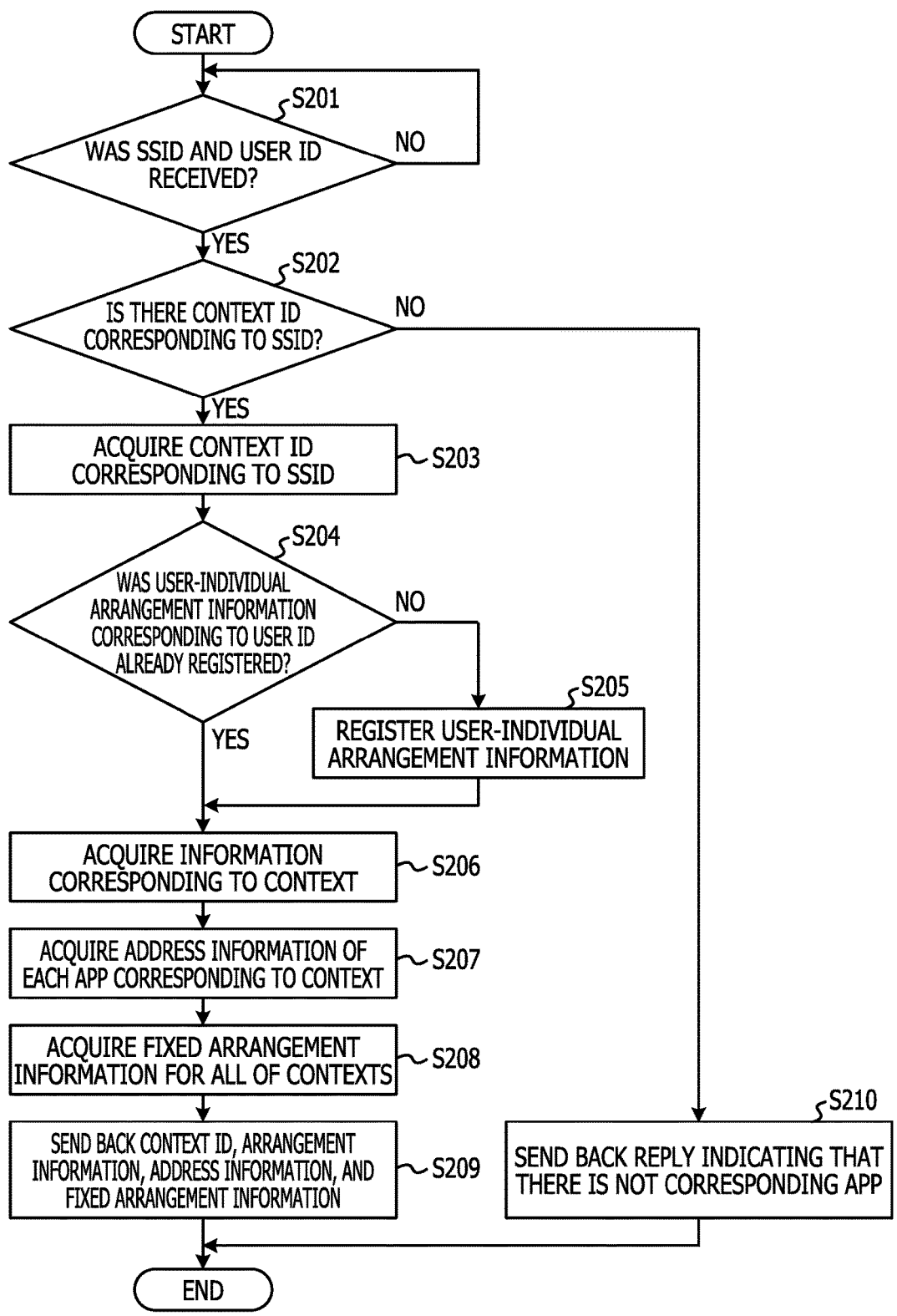
FIG. 7 is a flow chart illustrating an example of process steps executed by an information management server in accordance with reception of context estimation information.

Subsequently, process steps executed by the information management server 40 in accordance with reception of the context estimation information will be described. FIG. 7 is a flow chart illustrating an example of process steps executed by an information management server in accordance with reception of context estimation information.

If the context estimation unit 401 receives SSID and the user ID transmitted from the mobile terminal 10 (YES in S201), the context estimation unit 401 determines whether or not a context ID corresponding to the SSID is stored in the context information storage unit 411 (S202).

FIG. 8 is a table illustrating a configuration example of a context information storage unit. As illustrated in FIG. 8, a context ID is stored in the context information storage unit 411 in association with SSID. In this embodiment, a context ID is a character string that indicates a category of a place. Note that context estimation information may be used as a context ID. That is, in this embodiment, SSID may be used as a context ID. However, in this embodiment, there is a probability that SSID and a context ID are not in one-to-one correspondence. That is, there is a probability that the same context is estimated for a plurality of SSIDs. For example, in FIG. 8, "school" is stored in association with two SSIDs. Therefore, in this embodiment, context estimation information and a context ID are distinguished from each other.

If there is not a context ID corresponding to SSID (NO in S202), the display information transmission unit 402 sends back a reply indicating that there is not a corresponding application to the mobile terminal 10 (S210). As another alternative, a context ID input request may be sent back to the mobile terminal 10. In this case, in accordance with the input request, a context ID is input by a user. The mobile terminal 10 transmits the input context ID, SSID, and a user ID to the context estimation unit 401. The context estimation unit 401 stores the SSID and the context ID in the context information storage unit 411 in association with each other. Thereafter, Step S204 and subsequent process steps may be executed for the context ID.

If there is a context ID corresponding to SSID (YES in S202), the context estimation unit 401 acquires the context ID (which will be hereinafter referred to as a "target context ID") from the context information storage unit 411 (S203).

Subsequently, the display information transmission unit 402 determines whether or not information corresponding to the user ID (which will be hereinafter referred to a "target user ID") received in Step S201 is registered in the user-individual arrangement information storage unit 414 (S204). In this embodiment, for a user who accesses the user-individual arrangement information storage unit 414 for the first time, information is not stored in the user-individual arrangement information storage unit 414. Therefore, for the user, Step S205 is executed.

In Step S205, the display information transmission unit 402 stores information stored in the arrangement information storage unit 412 in the user-individual arrangement information storage unit 414 in association with a target user ID.

FIG. 9 is a table illustrating a configuration example of an arrangement information storage unit. In FIG. 9, the arrangement information storage unit 412 stores arrangement position information in association with a context ID for each of one or more app IDs.

An app ID is the app ID of an application (which is suitable for the corresponding context) corresponding to a context related to the context ID. Arrangement position information is information indicating the arrangement position of the icon of an application in the corresponding context. In this embodiment, arrangement position information is one of values defined as illustrated in FIG. 10.

Figure 10:
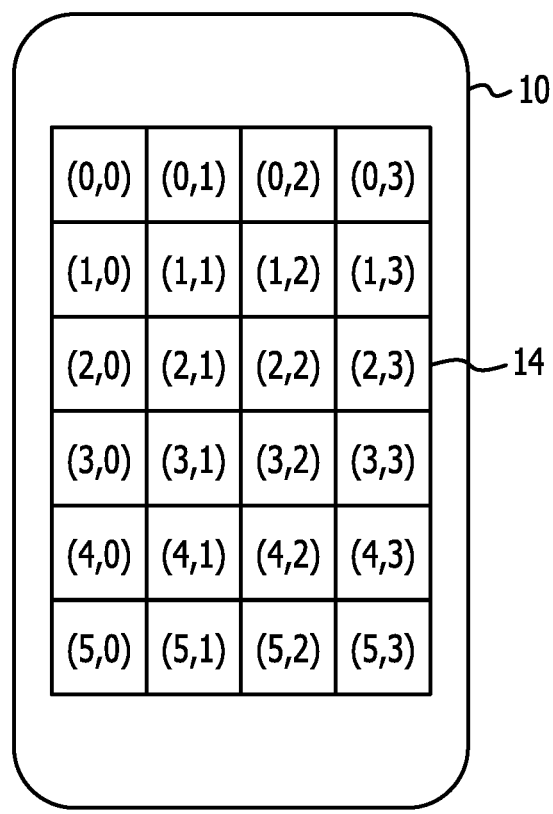
FIG. 10 is a diagram illustrating an example of values of arrangement position information.

FIG. 10 is a diagram illustrating an example of values of arrangement position information. As illustrated in FIG. 10, the arrangement position of an icon is associated with one of a plurality of divided areas formed by dividing a display area of the touch panel 14 into a plurality of areas, using the size of icons as a reference. In each of the divided areas, position information is allocated in a system of (a row number, a column number). In FIG. 10, the row number and the column number originate from the 0 origin. Note that each divided area is not a physical display area of the touch panel 14 but may be formed for a virtual display area. A virtual display area is a display area that has a larger display area than a physical display area and in which display of a non-display part is enabled by scroll.

In Step S205, each of app IDs and arrangement information associated with all of context IDs is copied from the arrangement information storage unit 412 to the user-individual arrangement information storage unit 414 and is associated with a target user ID.

FIG. 11 is a table illustrating a configuration example of a user-individual arrangement information storage unit. In FIG. 11, the user-individual arrangement information storage unit 414 stores information stored in the arrangement information storage unit 412 for each user. That is, in the user-individual arrangement information storage unit 414, information stored in the arrangement information storage unit 412 is stored in association with a user ID. Also, in the user-individual arrangement information storage unit 414, a fixation flag is stored for each app ID of each context. A fixation flag is information indicating whether or not the arrangement position of the icon of an application related to an app ID is fixed. "ON" indicates that the arrangement position is fixed. "OFF" indicates that the arrangement position is not fixed. An initial value is "OFF". Information including arrangement position information and a fixation flag for each app ID will be hereinafter referred to as "arrangement information".

In this case, it is assumed that the target user ID is "User1". That is, in FIG. 11, a context ID, an app ID, and arrangement position information associated with "User1" are information copied from the arrangement information storage unit 412. Note that, in the next and subsequent processing, when SSID is received with "User1", Step S205 is not executed.

Subsequently, the display information transmission unit 402 acquires information corresponding to the target context ID from the user-individual arrangement information storage unit 414 (S206). For example, if the target context ID is "school", records related to "App11", "App12", and "App13" associated with "school" in FIG. 11 are acquired.

Subsequently, the display information transmission unit 402 acquires address information regarding each application corresponding to the target context ID from the address information storage unit 413 (S207). Each application corresponding to the target context ID is an application related to each app ID acquired in Step S206.

FIG. 12 is a table illustrating a configuration example of an address information storage unit. In FIG. 12, the address information storage unit 413 stores an app URL, an icon URL, and the like, in association with the app ID of each application.

The app URL is a URL for a substance (for example, Web contents) of an application. An icon URL is a URL for the icon of an application.

Substantially, the display information transmission unit 402 acquires an app ID and arrangement position information (which will be hereinafter referred to as "fixed arrangement information") related to arrangement information for which the value of a fixation flag is "ON", among pieces of arrangement information related to each app ID associated with the target user ID in the user-individual arrangement information storage unit 414. After the fixed arrangement information is acquired, duplicate fixed arrangement information is removed. For convenience of describing fixed arrangement information, it is assumed that arrangement information corresponding to the target user ID is as illustrated in FIG. 13.

FIG. 13 is a table illustrating an example of arrangement information after an arrangement position is fixed for an application.

In FIG. 13, an example of update of arrangement information performed when fixation of the arrangement position of an application, the app ID of which is "App11", is instructed in the case where a target context ID is "school" is illustrated. In a context, if the arrangement position of an application is fixed, not only a fixation flag corresponding to the application in the context but also a fixation flag corresponding to the application in another context are updated to "ON". Therefore, in FIG. 13, not only the fixation flag of "App11" corresponding to "school" but also the fixation flag of "App11" corresponding to "station" are updated to "ON".

If the arrangement information corresponding to the target user ID is as illustrated in FIG. 13, the app ID of "App11" and the arrangement position information which correspond to "school" and the app ID of "App11" and the arrangement position information which correspond to "station" are acquired as fixed arrangement information. In this case, the app IDs of the obtained two pieces of fixed arrangement information are the same. Therefore, the two pieces of fixed arrangement information are integrated as one. In the following, an arrangement position related to fixed arrangement information is referred to a "fixed arrangement position". Note that, as illustrated in FIG. 11, if there is no arrangement information for which the value of a fixation flag is "ON", among pieces of arrangement information corresponding to the target user ID ("User1"), fixed arrangement information is not acquired.

Subsequently, the display information transmission unit 402 sends back a target context ID, arrangement information and address information of each application corresponding to the target context ID, and fixed arrangement information to the mobile terminal 10 that is a transmission source of SSID and a user ID (S209). However, if fixed arrangement information is not acquired, fixed arrangement information is not sent back.

Figure 14:
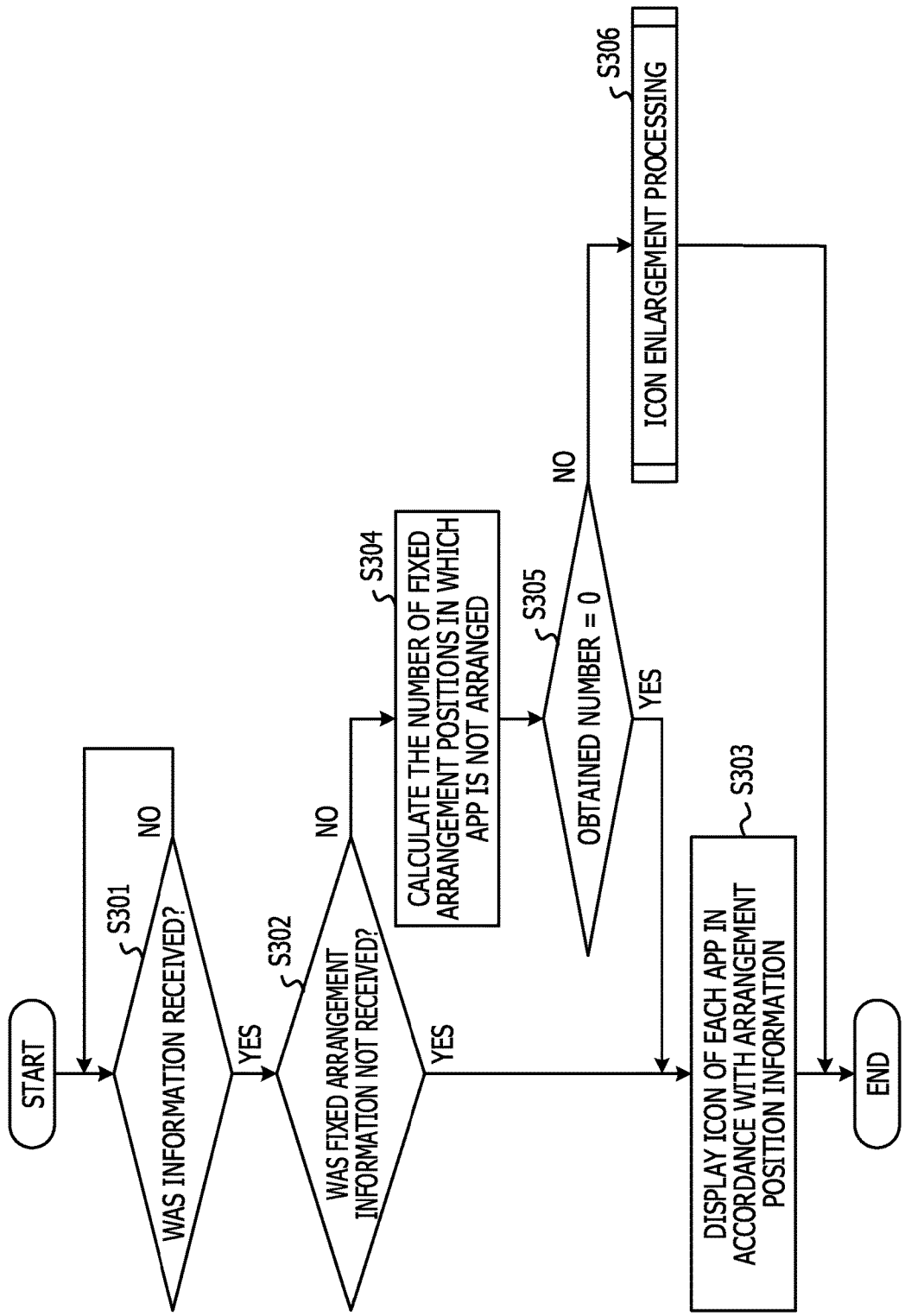
FIG. 14 is a flow chart illustrating an example of process steps of icon display processing.

Subsequently, process steps of icon display processing executed by the mobile terminal 10, based on information sent back from the information management server 40 in Step S209, will be described. FIG. 14 is a flow chart illustrating an example of process steps of icon display processing.

If the display information receiving unit 102 receives information sent back from the information management server 40 in Step S209 (YES in S301), the display control unit 103 determines whether or not fixed arrangement information was received (S302). That is, for a user related to the target user ID, whether or not there is an application, the arrangement position of an icon of which is fixed, is determined across all of contexts.

If fixed arrangement information was not received (YES in S302), the display control unit 103 causes display of the icon of each application in a position (a divided area) indicated by arrangement position information included in the received arrangement information of each application (S303). Note that the icon of each application is acquired (downloaded), for example, from the app server 30, based on the icon URL in address information included in pieces of information received in Step S301.

If fixed arrangement information was received (NO in S302), the display control unit 103 counts the number of arrangement positions, among fixed arrangement positions, in which an application is not arranged for this time (S303). That is, the number of fixed arrangement positions in which a gray icon described in (3) of FIG. 5 is displayed is counted. Such fixed arrangement positions may be counted by checking received fixed arrangement information and received arrangement information of each application with each other. That is, among pieces of fixed arrangement information which were received, the number of pieces of fixed arrangement information related to an arrangement position that does not match any of arrangement positions related to the arrangement information of each application corresponding to the target context ID is the obtained number.

If the obtained number is 0 (YES in S305), the display control unit 103 causes display of the icon of each application in a position indicated by arrangement position information included in pieces of received arrangement information (S303).

If the counted number is 1 or more (NO in S305), the display control unit 103 executes icon enlargement processing (S306).

Figure 15:
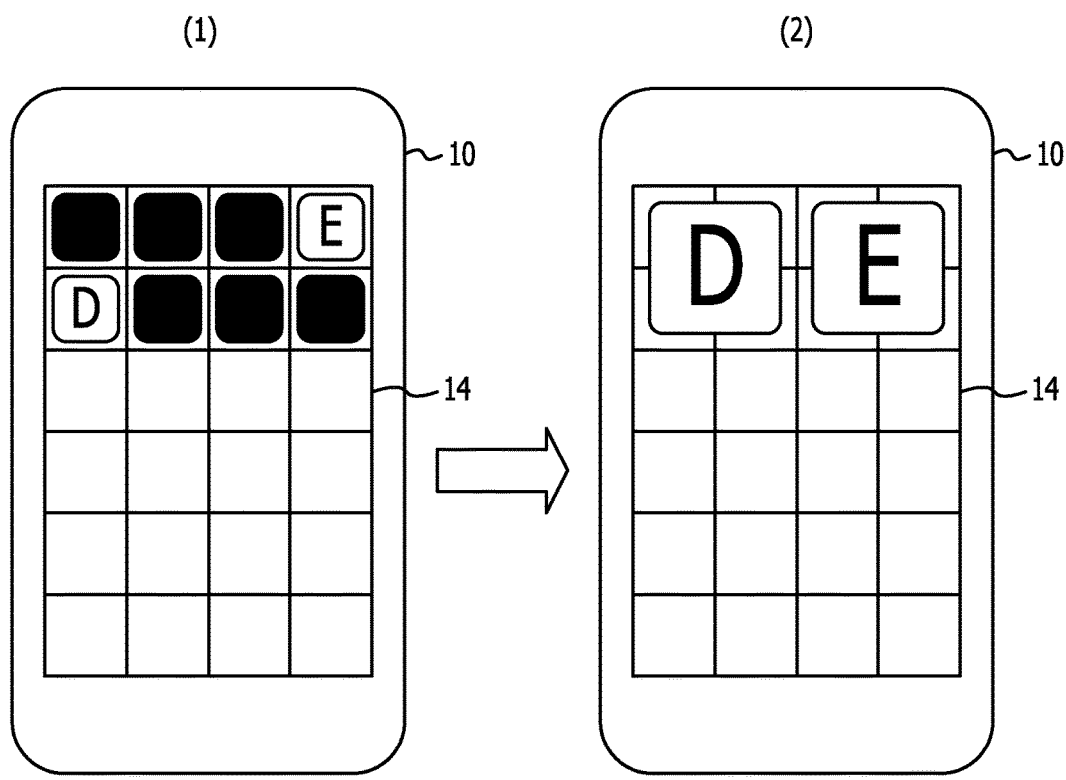
FIG. 15 is a diagram illustrating the outline of icon enlargement processing.

FIG. 15 is a diagram illustrating the outline of icon enlargement processing. When a plurality of fixed arrangement positions are set, in a context, for example, a state illustrated in (1) of FIG. 15 may be obtained. That is, in the context, the applications D and E are display targets, but arrangement positions (0, 0), (0, 1), (0, 2), (1, 1), (1, 2), and (1, 3) are fixed arrangement positions, and therefore, the icons of applications of display targets may not be arranged in these arrangement positions. Thus, in this example, it is indicated that the application D is arranged in the position (0, 3) and the application E is arranged in the position (1, 0).

In this case, as illustrated in (2), when the icon of each application is enlarged, the operability of each icon may be increased. As described above, processing of enlarging an icon by effectively using a fixed arrangement position that is not used is icon enlargement processing. Note that, in this embodiment, assuming that the size of divided areas is 1×1, an icon is enlarged to a size of 2×2. Therefore, there might be cases where all of fixed arrangement positions that are not used are not effectively used. For example, a fixed arrangement position illustrated in (3) of FIG. 5 may not be used as the enlarged area of an icon.

Figure 16:
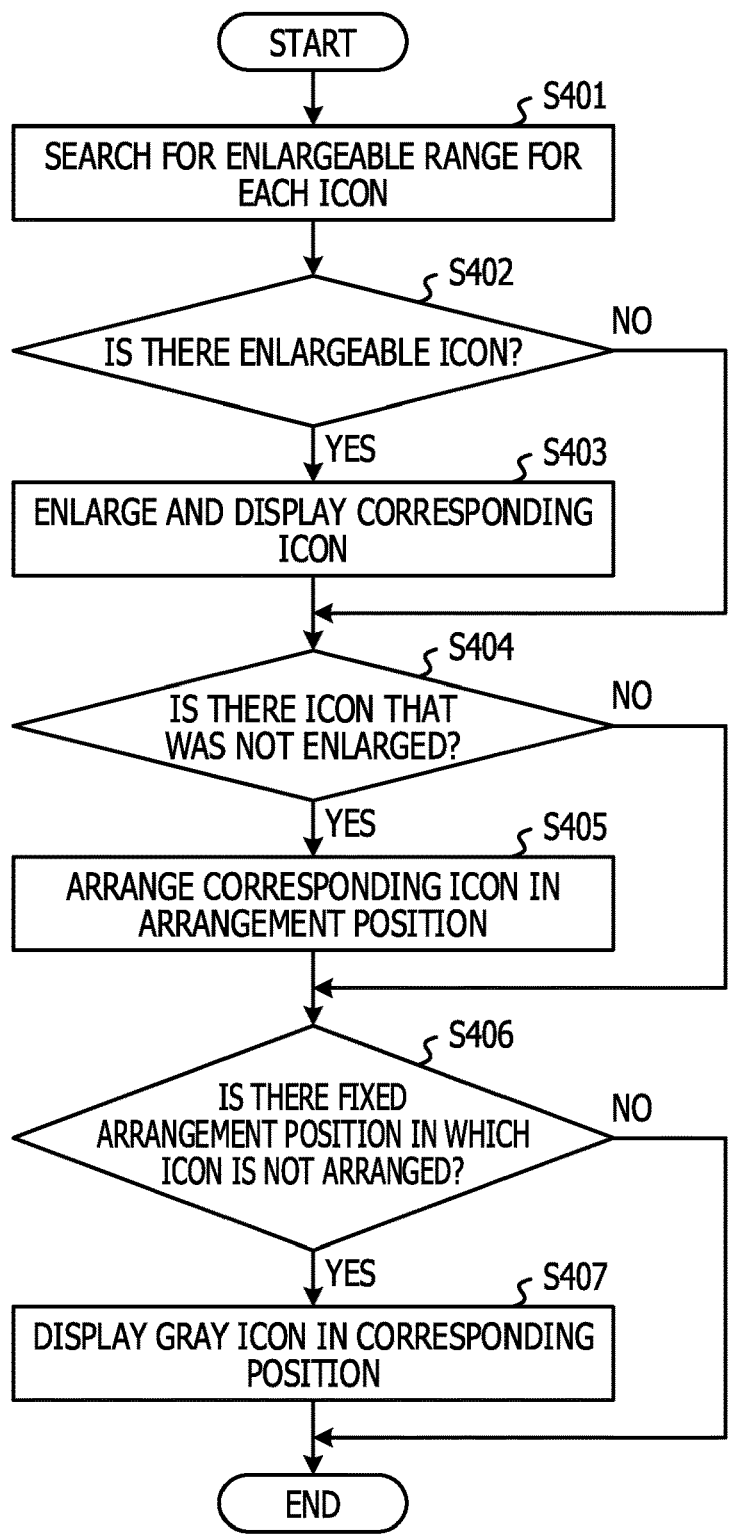
FIG. 16 is a flow chart illustrating an example of process steps of icon enlargement processing.

FIG. 16 is a flow chart illustrating an example of process steps of icon enlargement processing.

In Step S401, the display control unit 103 searches for an enlargeable range for each icon of an application that is a display target. An application that is a display target is an application related to arrangement information received in Step S301 of FIG. 14.

Search for an enlargeable range is performed by searching for an unused arrangement position located adjacent to an arrangement position related to the arrangement information of each application. In this embodiment, an icon is enlarged to a size of 2×2. Therefore, if unused arrangement positions are located adjacent to for an icon arranged at an arrangement position such that each of the icons may be enlarged to a size of 2×2, an arrangement position, among the unused arrangement positions, which is included in the enlarged area of the icon, is obtained as an enlargeable range for an application related to the icon. Note that, for each application, an unused arrangement position allocated as an enlargeable range for another application may not be used. Also, for each application, after an enlargeable range is sequentially searched for, the enlargeable range for each application may be optimized. To optimize an enlargeable range is to allocate an enlargeable range to each application such that the number of applications icons of which may be enlarged is maximum. Note that an unused arrangement position that may be included in an enlarged area of an icon may be limited to a fixed arrangement position. That is, an unused arrangement position that is not a fixed arrangement position may be excluded from an enlarged area.

As a result of search for an enlargeable range, if there is an enlargeable icon (YES in S402), the display control unit 103 enlarges the icon to an enlargeable range and causes display of the enlarged icon.

Subsequently, the display control unit 103 determines whether or not there is an icon that was not enlarged (S404). If there is an icon that was not enlarged (YES in S404), the display control unit 103 causes display of the icon in a normal size in an arrangement position related to the arrangement information of an application related to the icon (S405).

Subsequently, the display control unit 103 determines whether or not there is a fixed arrangement position in which an icon is not arranged (S406). That is, whether or not there is a fixed arrangement position that was not effectively used as an enlarged area of an icon is determined. If there is such a fixed arrangement position (YES in S406), the display control unit 103 causes display of a gray icon in the fixed arrangement position (S407). An icon other than a gray icon may be displayed in the fixed arrangement position.

Note that, in this embodiment, an example where the enlarged size of an icon is limited to 2×2 has been described but, for example, the limitation of the enlarged size of an icon may be relaxed, as illustrated in FIG. 17.

FIG. 17 is a diagram illustrating an example of icon enlarged display when the limitation of the enlarged size of an icon is relaxed.

In FIG. 17, (1) illustrates an example where the icon of the application A is enlarged to a size of 1×3. (2) illustrates an example where each of the icons of the applications D and E is enlarged to a size of 2×1 and the icon of the application F is enlarged to a size of 2×2. Note that, in (2), for the enlarged icon of the application F, the enlarged area includes an arrangement position (an arrangement position located immediately left of the icon of the application F before being enlarged) other than a fixed arrangement position.

When the icons of applications are displayed, a user may operate an icon to use an application. For example, when one of the icons is tapped (selected), the mobile terminal 10 downloads, based on the app URL of an application related to the icon, the application, for example, from the app server 30, and causes display of the application.

Also, the user may perform an operation that indicates a fixation instruction on an icon to thereby fix the arrangement position of an application related to the icon.

Now, an operation that indicates a fixation instruction will be described. Generally, in a smart phone, a tablet terminal, or the like, as operations performed on a touch panel, a tap, a double tap, a long tap, a flick, a swipe, a pinch-in, a pinch-out, and the like, are reserved. Therefore, as an operation distinguishable from these operations, a fixation instruction is desirably allocated.

Then, in this embodiment, an operation (which will be also referred to as a "depression") of depressing an icon that is an operation target is newly defined. A depression is an operation of applying a certain level of pressure on an icon that is an operation target. Such an operation is considered to be an intuitive operation relative to a concept of icon arrangement position fixation.

Now, as predetermined operations that are similar to a depression, there are a tap and a long tap. Therefore, a method for distinguishing a tap and a long tap from a depression are desired to be examined.

A pressure applied by a contact object, such as a finger, and the like, to a contact surface of the touch panel 14 greatly varies among users. Thus, in addition to a pressure, a contact area of a part in which the contact object contacts the contact surface may be used as a parameter used for distinguishing a tap, a long tap, and a depression from one another.

Figure 18:
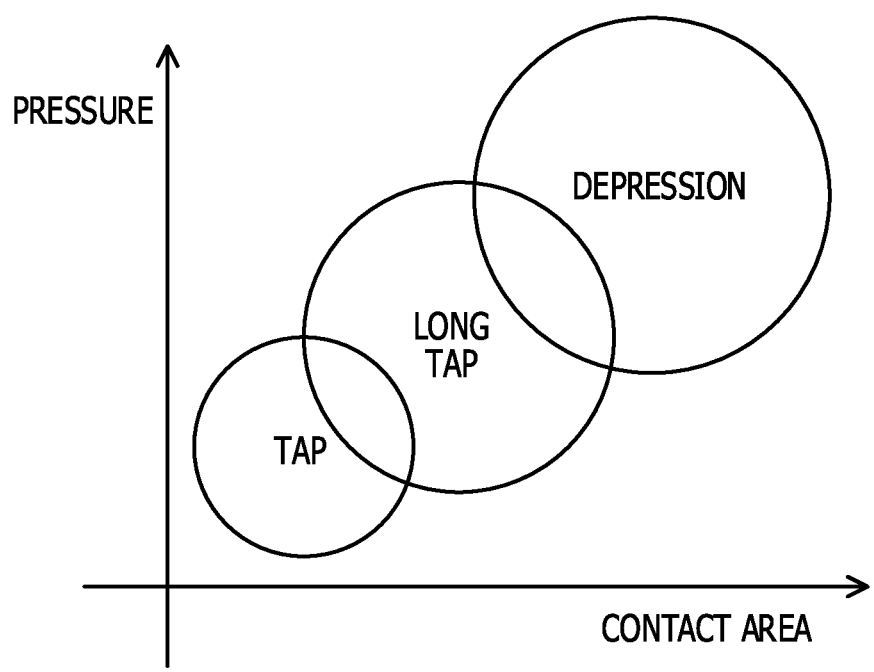
FIG. 18 is a diagram illustrating an example of the relationship among a pressure, a contact area, and three operations.

FIG. 18 is a diagram illustrating an example of the relationship among a pressure, a contact area, and three operations. In FIG. 18, the abscissa corresponds to the contact area. The ordinate corresponds to the pressure. As illustrated in FIG. 18, based on the pressure and the contact area, duplicate parts are generated between a tap and a long tap and between a long tap and a depression. It is difficult to distinguish each operation from another in the duplicate parts.

Note that the pressure and the contact area that are caused to correspond to a depression may be shifted to a range in which there is no duplication part with a long tap. In that case, however, a user is desired to apply increased depressing force, and thus, reduction in operability of a depression, a failure of the touch panel 14, and the like, might be caused.

Thus, in this embodiment, an operation time (a contact time in which a contact object contacts a contact surface) is further added to parameters used for distinguishing each operation from another.

Figure 19:
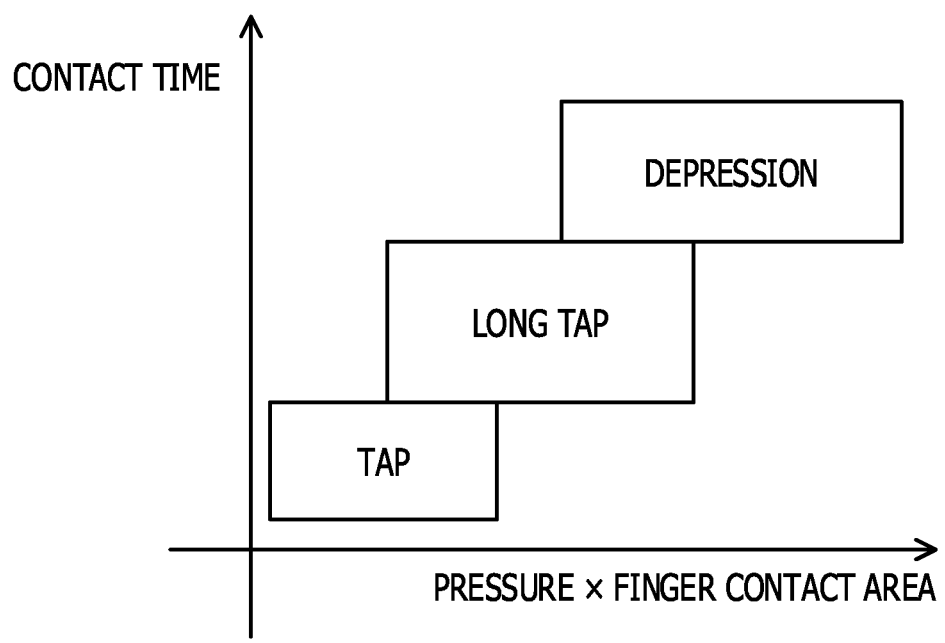
FIG. 19 is a diagram illustrating an example of the relationship among a pressure, a contact area, a contact time, and three operations.

FIG. 19 is a diagram illustrating an example of the relationship among a pressure, a contact area, a contact time, and three operations. In FIG. 19, the abscissa corresponds to the pressure×the contact area. The ordinate corresponds to the contact time. As illustrated in FIG. 19, the contact time is considered, and thus, a probability that the three operations may be distinguished from one another may be increased.

Figure 20:
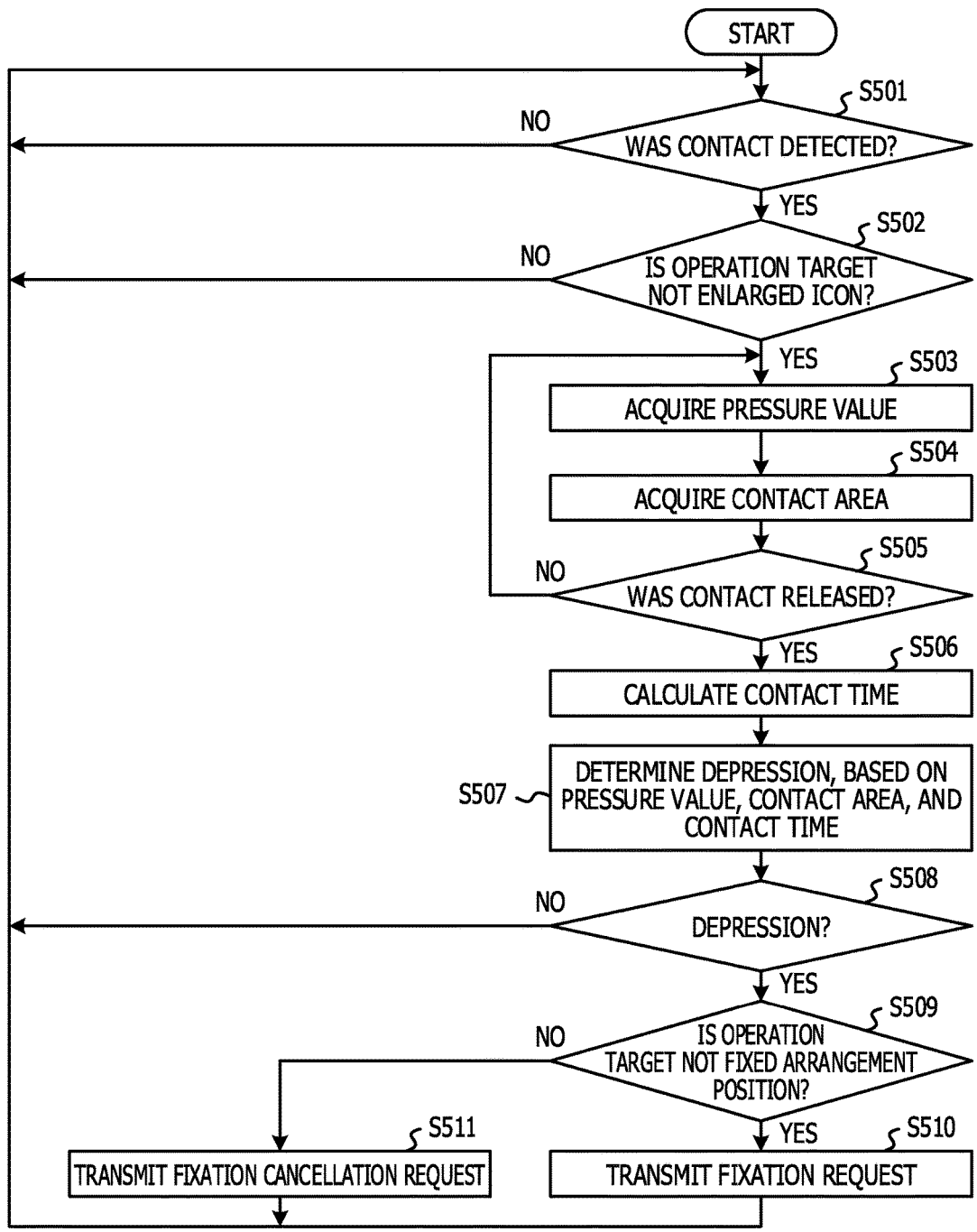
FIG. 20 is a flow chart illustrating an example of process steps executed by a fixation instruction monitoring unit.

The fixation instruction monitoring unit 104 detects a fixation instruction, that is, a depression, by processing based on the above-described idea. FIG. 20 is a flow chart illustrating an example of process steps executed by a fixation instruction monitoring unit.

If a contact of a contact object to a contact surface is detected by the touch panel 14 (YES in S501), the fixation instruction monitoring unit 104 determines whether or not an icon that is an operation target is an enlarged icon (S502). The icon that is an operation target is an icon that is arranged in the contact part which the contact object contacts. Also, the icon on which enlargement processing was performed is an icon enlarged in Step S403 of FIG. 16.

If the icon that is an operation target is an enlarged icon (NO in S502), subsequent processing is not executed and predetermined event processing is performed. That is, the fixation instruction monitoring unit 104 does not receive a fixation instruction for the enlarged icon. This is because, for the enlarged icon, it is difficult to correctly comprehend an intention of the user regarding which arrangement position the enlarged icon is to be fixed.

If the icon that is an operation target is not enlarged (YES in S502), the fixation instruction monitoring unit 104 continuously acquires a value (a pressure value) indicating a pressure applied to a contact surface by a contact object until the contact of the contact object is released (S505) and the area (a contact area) of a contact part (S503, S504). For example, the pressure value is acquired from the pressure sensor 18. The contact area is calculated based on the contact part the position and shape of which are identified by the touch control IC 17. As another alternative, the contact area may be calculated based on the distribution of a pressure applied to the pressure sensor 18.

If release of the contact of the contact object is detected by the touch panel 14 (YES in S505), the fixation instruction monitoring unit 104 calculates an elapsed time (a contact time) from detection of a contact to detection of release of the contact object (S506). For example, a contact time is calculated based on the time when a contact was detected and the time when the contact of the contact object was released.

Subsequently, the fixation instruction monitoring unit 104 determines, by applying the pressure value, the contact area, and the contact time to information stored in the determination information storage unit 111, whether or not an operation performed by a user is a depression (S507).

FIG. 21 is a table illustrating a configuration example of a determined information storage unit. In FIG. 21, the determination information storage unit 111 stores an operation type for each combination of the pressure×the contact area and the contact time.

Note that, in FIG. 21, records regarding a tap and a long tap is illustrated, but only a record regarding a depression may be stored in the determination information storage unit 111.

If each of the pressure value×the contact area and the contact time is included in the range stored in a record regarding a depression, the fixation instruction monitoring unit 104 determines that an operation performed by the user is a depression. In the example of FIG. 21, if the value of the pressure×the contact area is greater than 0.15 and the contact time is longer than 1.5 seconds, it is determined that an operation performed by the user is a depression.

Note that the pressure value and the contact area used for checking with information stored in the determination information storage unit 111 may be a maximum value or may be an average value during a period related to the contact time. As another alternative, the pressure value and the contact area may be calculated using another method.

If it is determined that an operation performed by a user is not a depression (NO in S508), subsequent processing is not executed and predetermined event processing is performed. If it is determined that an operation performed by a user is a depression (YES in S508), the fixation instruction monitoring unit 104 determines whether or not the arrangement position of the icon that is an operation target was already set as a fixed arrangement position (S509). The determination may be performed based on fixed arrangement information received from the information management server 40.

If the arrangement position of an icon that is an operation target is not a fixed arrangement position (YES in S509), the fixation instruction monitoring unit 104 transmits an icon arrangement position fixation request for the icon is transmitted to the information management server 40 (S510). On the other hand, if the arrangement position of the icon that is an operation target is a fixed arrangement position (NO in S509), the fixation instruction monitoring unit 104 transmits an arrangement position fixation cancellation request for the icon to the information management server 40 (S511).

Note that each of a fixation request and a fixation cancellation request includes a user ID and the app ID of an application related to the icon that is an operation target. Also, the fixation request includes the arrangement position information, and the like, of the application related to the icon that is an operation target. The user ID is a user ID related to the mobile terminal 10.

Also, whether or not the arrangement position of an icon is fixed may be visually confirmable. For example, the frame of an icon the arrangement position of which is fixed may be changed to a predetermined color. Thus, a user may easily recognize whether a depression performed on an icon is interpreted as a fixation instruction or a fixation cancellation instruction.

Figure 22:
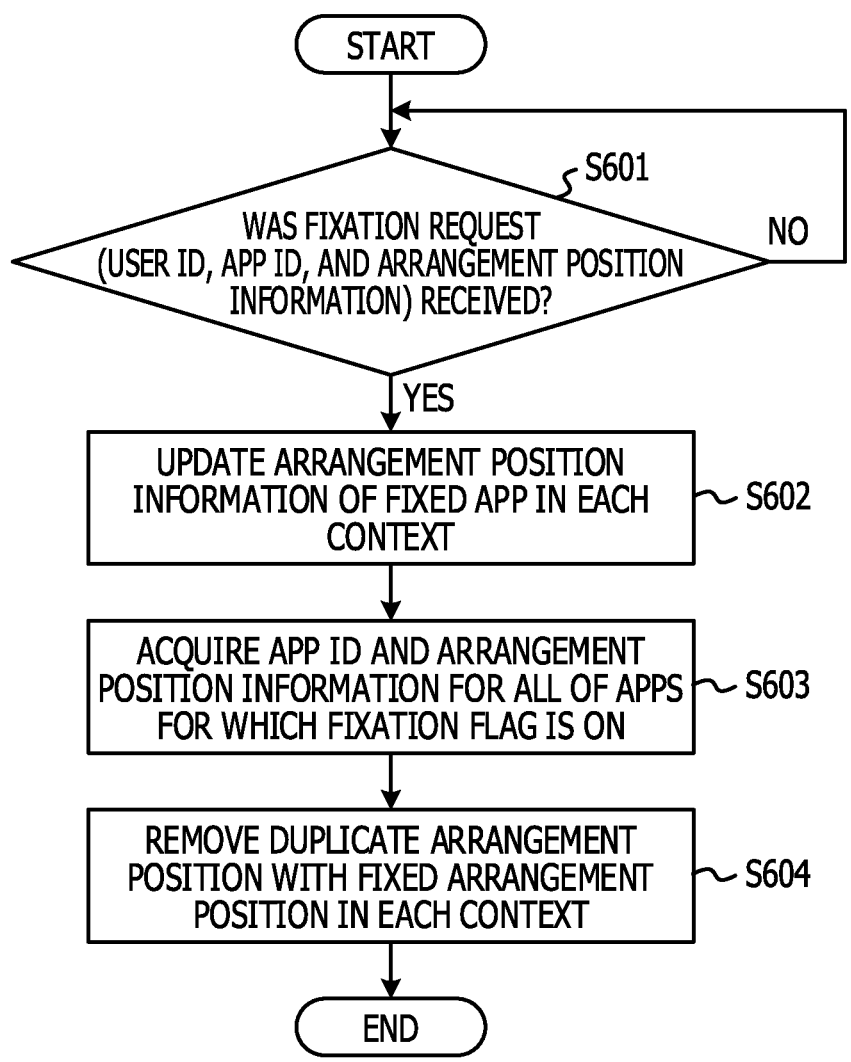
FIG. 22 is a flow chart illustrating an example of process steps of icon arrangement position fixation processing.

Subsequently, process steps executed by the information management server 40 in accordance with an icon arrangement position fixation request will be described. FIG. 22 is a flow chart illustrating an example of process steps of icon arrangement position fixation processing.

If the arrangement fixation unit 403 receives a fixation request transmitted from the mobile terminal 10 (YES in S601), the arrangement fixation unit 403 executes processing of Step S602 and subsequent process steps. Note that, in the following, a target of processing performed for information stored in the user-individual arrangement information storage unit 414 is information that corresponds to a user ID (which will be hereinafter referred to as a "target user ID") included in the fixation request. The information will be hereinafter referred to as target-user-individual information.

In Step S602, the arrangement fixation unit 403 updates arrangement information related to an app ID included in the fixation request in the target-user-individual information. Specifically, the value of the fixation flag of the arrangement information is updated to "ON", the value of arrangement position information for the arrangement information is updated to that of the arrangement position information received in Step S601. Note that the update is executed for all of contexts to which the app ID corresponds. For example, if the target user ID is "User1" and the app ID is "App11", the fixation flag of App11 corresponding to "school" and the fixation flag of App11 corresponding to "station" are updated to "ON" in FIG. 11, and the arrangement position information of App11 corresponding to "station" is updated to (0, 0).

Subsequently, the arrangement fixation unit 403 acquires the app ID and the arrangement position information of a record for which the value of a fixation flag is "ON" in the target-user-individual information (S603). Also, in this case, all of contexts are processing targets. Note that pieces information, among all of pieces of acquired information, for which the value matches, are integrated as one.

Subsequently, the arrangement fixation unit 403 updates the value of arrangement position information for arrangement information, among pieces of arrangement information included in each application for each context in the user-individual information, for which the value of a fixation flag is "OFF" and which is duplicate arrangement information with fixed arrangement information acquired in Step S603 (S604).

FIG. 23 is a table illustrating an example of change of duplicate arrangement position information with fixation arrangement information. In FIG. 23, a case where, for "App11" corresponding to "school", the arrangement position is fixed at (0, 0) is illustrated. In this case, in Step S602, the arrangement position information of "App11" corresponding to "station" is updated from (0, 1) to (0, 0). As a result, in Step S603, "App11" and (0,0) are acquired.

In Step S604, each of the values of the fixation flag is "OFF" and the arrangement position information for "App21" corresponding to "station" and the arrangement position information for "App31" corresponding to "hospital", each of which is (0, 0), is changed from (0, 0) to (0, 1).

Note that change of the arrangement position information performed in Step S604 may be performed such that, in each context, the order of arrangement positions of icons of applications, except an application, the arrangement position of which is fixed, is maintained. For example, if an application, the app ID of which is "App41", corresponds to "hospital" and the arrangement position information of the application is (0, 1), the arrangement position information of "App31" corresponding to "hospital" may be changed to (0, 1), and furthermore, the arrangement position information of "App41" may be serially changed to (0, 2). If the maintenance of the order of arrangement positions is not considered, the arrangement position information of "App31" may be changed to (0, 2) and the arrangement position information of "App41" may not be changed.

Note that, in Step S603, if fixed arrangement position information is acquired for a plurality of applications, that is, if the arrangement positions of icons of a plurality of applications are fixed, in Step S604, the arrangement position information may be changed so as not to duplicate with any of fixed arrangement positions.

Figure 24:
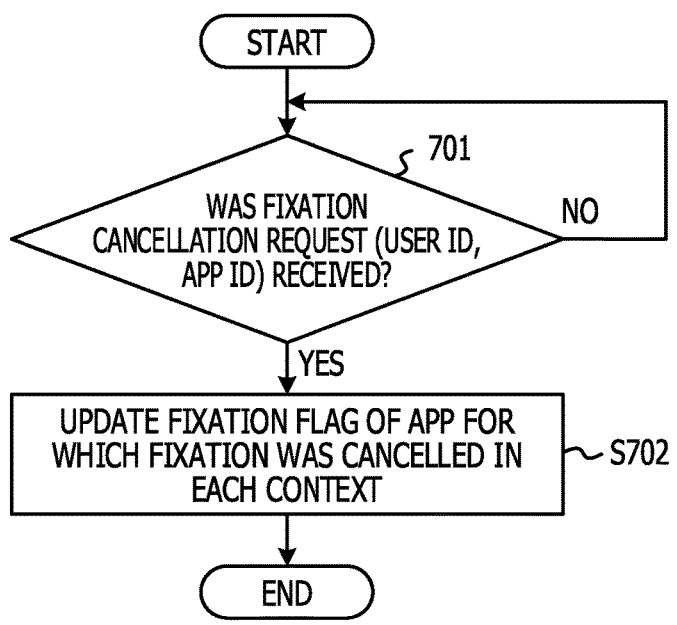
FIG. 24 is a flow chart illustrating an example of process steps of icon arrangement position fixation cancellation processing.

Subsequently, process steps executed by the information management server 40 in accordance with an arrangement position fixation cancellation request will be described. FIG. 24 is a flow chart illustrating an example of process steps of icon arrangement position fixation cancellation processing.

If the fixation cancellation unit 404 receives a fixation cancellation request transmitted from the mobile terminal 10 (YES in S701), the fixation cancellation unit 404 executes Step S702. Note that, in the following, a target of processing performed for information stored in the user-individual arrangement information storage unit 414 is information corresponding to a user ID (which will be hereinafter referred to as a "target user ID") included in the fixation cancellation request. The information will be hereinafter referred to as target-user-individual information.

In Step S702, the fixation cancellation unit 404 updates the value of a fixed flag related to an app ID included in the fixation cancellation request is updated to "OFF" in the target-user-individual information. Note that the update is executed for all of contexts to which the app ID corresponds.

As described above, according to the first embodiment, for an application, the arrangement position of an icon of which is fixed in a context, the icon is displayed in the same arrangement position also in another context. Therefore, an application that is distributed may be easily selected in accordance with a situation of a user.

Also, arrangement position fixation is performed by a "depression" that is a different operation from a predetermined operation, and therefore, a user may instruct fixation of an arrangement position by a simple operation without operating a display component, such as a menu, and the like.

Next, a second embodiment will be described. In the second embodiment, a difference from the first embodiment will be described. Therefore, for a point that is not specifically described, the configuration may be similar to that in the first embodiment.

Figure 25:
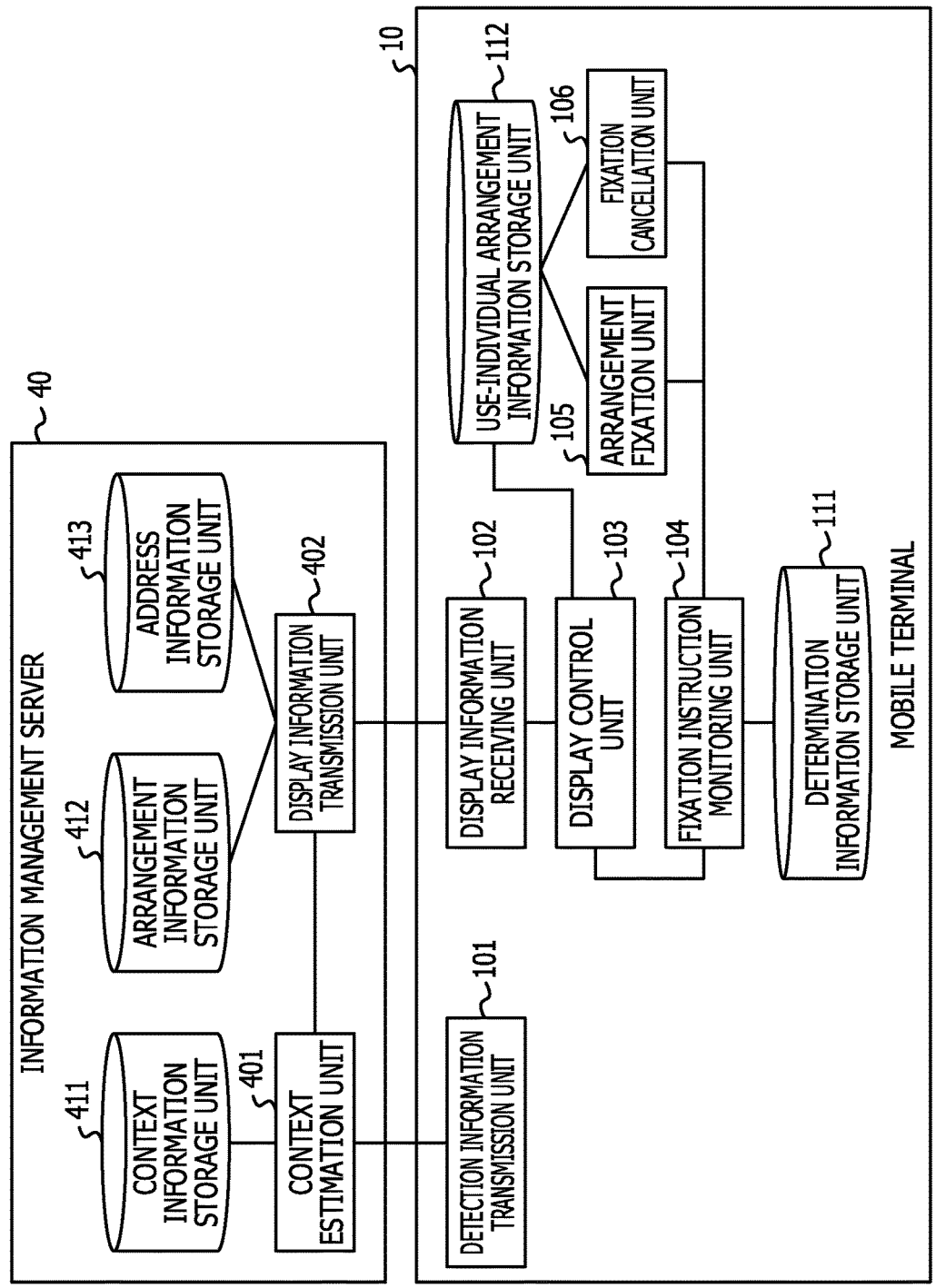
FIG. 25 is a diagram illustrating a function configuration example of a mobile terminal and an information management server according to a second embodiment.

FIG. 25 is a diagram illustrating a function configuration example of a mobile terminal and an information management server according to the second embodiment. In FIG. 25, the mobile terminal 10 further includes an arrangement fixation unit 105, a fixation cancellation unit 106, and a user-individual arrangement information storage unit 112. Each of the arrangement fixation unit 105 and the fixation cancellation unit 106 is realized by processing which one or more programs installed in the mobile terminal 10 cause CPU 11 to execute. The user-individual arrangement information storage unit 112 may be realized, for example, using the auxiliary storage device 13.

The functions of the arrangement fixation unit 105 and the fixation cancellation unit 106 are similar to the functions of the arrangement fixation unit 403 and the fixation cancellation unit 404 of the first embodiment. Information stored in the user-individual arrangement information storage unit 112 is similar to information stored in the user-individual arrangement information storage unit 414 in the first embodiment. However, the user-individual arrangement information storage unit 112 may store only information regarding a user who uses the mobile terminal 10. For example, if the mobile terminal 10 is a terminal, such as a smart phone, and the like, used by an individual person, only information regarding a single user may be stored in the user-individual arrangement information storage unit 112.

On the other hand, there may be cases where the information management server 40 does not include the arrangement fixation unit 403, the fixation cancellation unit 404, and the user-individual arrangement information storage unit 414.

That is, in the second embodiment, for the arrangement position of each application, information that indicates whether or not the arrangement position is fixed, is managed in each mobile terminal 10.

Process steps executed in the second embodiment are clear based on the first embodiment, and therefore, the description thereof will be omitted.

Note that, in each of the above-described embodiments, an example where, in the arrangement information storage unit 412, an initial value of an arrangement position for each application is stored has been described, but there may be cases where the initial value is not stored. For example, the initial value of the arrangement position of each application may be determined in accordance with the order of arrangement of app IDs in the arrangement information storage unit 412. In this case, an arrangement position for an application, which is fixed, may be stored in the user-individual arrangement information storage unit 414. In this case, a fixation flag may not be stored in the user-individual arrangement information storage unit 414. This is because, it is indicated by the fact that an arrangement position is stored in the user-individual arrangement information storage unit 414 that an icon is fixed in the arrangement position.

Also, a mobile terminal, such as an in-vehicle device, and the like, may be used as the mobile terminal 10 in each of the above-described embodiments.

Note that, in each of the above-described embodiments, the mobile terminal 10 is an example of the display terminal. The display information receiving unit 102 is an example of the receiving unit. An icon is an example of an image corresponding to an application. An image corresponding to an application other than an icon may be used. The touch panel 14 is an example of the display unit. The fixation instruction monitoring unit 104 is an example of the detection unit. Each of the user-individual arrangement information storage unit 414 and the user-individual arrangement information storage unit 112 is an example of the storage unit. Each of the fixation instruction monitoring unit 104 in the first embodiment and the arrangement fixation unit in the second embodiment is an example of the storage processing unit. A fixation flag, the value of which is "ON", is an example of the information that associates identification information of an application and arrangement position information of an image corresponding to the information corresponding to the application with each other.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A display terminal comprising:
  a memory; and
  a processor coupled to the memory and configured to:
    transmit estimation information that includes information of an access point and information of a user of the display terminal to a management device when it is determined that the access point has been detected,
    receive display information that includes information of one or more applications corresponding to the estimation information and information of arrangement positions of the one or more applications from the management device, the display information being extracted from arrangement information in which an application, the user, a location of the user, an arrangement position of an image corresponding to the application, and a flag indicating whether the arrangement position is fixed regardless of the location, are associated with each other for each of the one or more applications,
    display one or more images corresponding to the one or more applications on a screen of the display terminal in accordance with the received display information;
    when a depression of a target image of the one or more images by a contact object is detected, determine whether the target image is an enlarged image enlarged using the arrangement position that is not used;
    when it is determined that the target image is an enlarged image, control so as not to receive a fixation instruction for fixing the enlarged image;
    when it is determined that the target image is not an enlarged image, acquire a pressure applied to a surface of the screen by the contact object,
    acquire a contact area on which the contact object contacts the surface,
    calculate a contact time during which the contact object has contacted the surface, after the depression has been released,
    determine that the depression is a predetermined operation when a product of the pressure and the contact area is greater than a first threshold and when the contact time is longer than a second threshold, the predetermined operation indicating the fixinqan instruction for fixing the arrangement position,
    transmit a request for updating the flag in the arrangement information when it is determined that the depression is the predetermined operation, and
    receive the display information extracted from the updated arrangement information when it is determined that the access point has been detected after transmitting the request.

2. The display terminal according to claim 1,
wherein the arrangement information is information indicating one of a plurality of divided areas formed by dividing a display area of the screen into a plurality of areas.

3. The display terminal according to claim 1,
wherein the processor is configured to
when the display information related to any of the one or more applications is not received, control the display terminal to suppress displaying an image corresponding to another application of the one or more applications on the arrangement position of the any of the one or more applications.

4. The display terminal according to claim 1,
wherein the processor is configured to
when the display information related to any of the one or more applications is not received, control the display terminal to enlarge an image corresponding to another application of the one or more applications using the arrangement position of the any of the one or more applications.

5. The display terminal according to claim 1,
wherein the estimation information includes a service set identifier (SSID) of the detected access point and an identifier of the user of the display terminal.

6. The display terminal according to claim 4,
wherein the processor is configured to enlarge the image corresponding to the another application so as to cover the arrangement position of the any of the one or more applications with the enlarged image.

7. The display terminal according to claim 1,
wherein the processor is configured to acquire the contact area based on a contact part of which position and shape are specified by an integrated circuit, the integrated circuit configured to execute identification of the position and the shape of the contact part based on a coordinate group input by a sensor that detected the depression.

8. The display terminal according to claim 1,
wherein the processor is configured to calculate the contact area based on a distribution of a pressure applied to a pressure sensor by the depression.

9. A display method executed by a processor included in a display terminal, the display method comprising:
  transmitting estimation information that includes information of an access point and information of a user of the display terminal to a management device when it is determined that the access point has been detected;
  receiving display information that includes information of one or more applications corresponding to the estimation information and information of arrangement positions of the one or more applications from the management device, the display information being extracted from arrangement information in which an application, the user, a location of the user, an arrangement position of an image corresponding to the application, and a flag indicating whether the arrangement position is fixed regardless of the location, are associated with each other for each of the one or more applications;

displaying one or more images corresponding to the one or more applications on a screen of the display terminal in accordance with the received display information;

when a depression of one of the one or more images by a contact object is detected, determining whether the target image is an enlarged image enlarged using the arrangement position that is not used;

when it is determined that the target image is an enlarged image, controlling so as not to receive fixation instruction for fixing the enlarged image;

when it is determined that the target image is not an enlarged image, acquiring a pressure applied to a surface of the screen by the contact object;

acquiring a contact area on which the contact object contacts the surface;

calculating a contact time during which the contact object has contacted the surface, after the depression has been released;

determining that the depression is a predetermined operation when a product of the pressure and the contact area is greater than a first threshold and when the contact time is longer than a second threshold, the predetermined operation indicating the fixing instruction for fixing the arrangement position;

transmitting a request for updating the flag in the arrangement information when it is determined that the depression is the predetermined operation; and receiving the display information extracted from the updated arrangement information when it is determined that the access point has been detected after transmitting the request.

10. The method according to claim 9,
wherein the arrangement information is information indicating one of a plurality of divided areas formed by dividing a display area of the display screen into a plurality of areas.

11. The method according to claim 9, further comprising when the display information related to any of the one or more applications is not received, controlling the display terminal to suppress displaying an image corresponding to another application of the one or more applications on the arrangement position of the any of the one or more applications.

12. The method according to claim 9, further comprising when the display information related to any of the one or more applications is not received, controlling the display terminal to enlarge an image corresponding to another application of the one or more applications using the arrangement position of the any of the one or more applications.

13. The display method according to claim 9, wherein the displaying includes:
searching an enlargeable range for each of the one or more images;
determining whether there is an enlargeable image among the one or more images based on the searched enlargeable range;
enlarging the enlargeable image based on the searched enlargeable range; and
causing display of the enlarged image.

14. The display method according to claim 13, wherein the searching includes:
searching, for each of the one or more images, an unused arrangement position located adjacent to the arrangement position of an image.

15. The display method according to claim 13, further comprising assigning, based on a result of the searching, the enlargeable range to each of the one or more images such that a number of application images which are enlargeable, becomes maximum.

16. A non-transitory computer-readable recording medium that stores a display program for causing a computer to execute a process comprising:
transmitting estimation information that includes information of an access point and information of a user of the display terminal to a management device when it is determined that the access point has been detected;

receiving display information that includes information of one or more applications corresponding to the estimation information and information of arrangement positions of the one or more applications from the management device, the display information being extracted from arrangement information in which an application, the user, a location of the user, an arrangement position of an image corresponding to the application, and a flag indicating whether the arrangement position is fixed regardless of the location, are associated with each other for each of the one or more applications;

displaying one or more images corresponding to the one or more applications on a screen of the display terminal in accordance with the received display information;

when a depression of one of the one or more images by a contact object is detected, determining whether the target image is an enlarged image enlarged using the arrangement position that is not used;

when it is determined that the target image is an enlarged image, controlling so as not to receive fixation instruction for fixing the enlarged image;

when it is determined that the target image is not an enlarged image, acquiring a pressure applied to a surface of the screen by the contact object;

acquiring a contact area on which the contact object contacts the surface;

calculating a contact time during which the contact object has contacted the surface, after the depression has been released;

determining that the depression is a predetermined operation when a product of the pressure and the contact area is greater than a first threshold and when the contact time is longer than a second threshold, the predetermined operation indicating an instruction for fixing the arrangement position;

transmitting a request for updating the flag in the arrangement information when it is determined that the depression is the predetermined operation; and receiving the display information extracted from the updated arrangement information when it is determined that the access point has been detected after transmitting the request.

* * * * *